United States Patent
Hankinson et al.

[11] Patent Number: 5,838,390
[45] Date of Patent: Nov. 17, 1998

[54] SYSTEM AND METHOD FOR MULTI-LEVEL GAIN CONTROL

[75] Inventors: Robert J. Hankinson, Carrollton; Scott Curry, Coppell, both of Tex.

[73] Assignee: Cirrus Logic, Inc., Fremont, Calif.

[21] Appl. No.: 577,652

[22] Filed: Dec. 22, 1995

[51] Int. Cl.⁶ .................................................. H04N 5/52
[52] U.S. Cl. ........................ 348/682; 348/678; 348/521
[58] Field of Search ................................. 348/678, 679, 348/682, 683, 684, 685, 500, 501, 521, 524, 533, 534, 535, 536, 540, 545; 358/174, 176; H04N 5/52

[56] References Cited

U.S. PATENT DOCUMENTS

| | | | |
|---|---|---|---|
| 3,588,351 | 6/1971 | Baun | 178/69.5 |
| 4,434,439 | 2/1984 | Steckler et al. | 358/174 |
| 4,517,586 | 5/1985 | Balaban et al. | 358/13 |
| 4,625,240 | 11/1986 | Yablonski et al. | 358/143 |
| 4,733,301 | 3/1988 | Wright, Jr. | 358/181 |
| 4,807,035 | 2/1989 | Sayliss | 358/174 |
| 5,157,493 | 10/1992 | Hamon et al. | 348/678 |
| 5,173,775 | 12/1992 | Walker | 358/141 |
| 5,379,075 | 1/1995 | Nagasawa et al. | 348/678 |
| 5,410,363 | 4/1995 | Capen et al. | 348/679 |

*Primary Examiner*—John K. Peng
*Assistant Examiner*—Chris Grant
*Attorney, Agent, or Firm*—Fulbright & Jaworski; Steven A. Shaw

[57] ABSTRACT

An analog to digital converter circuit having sync control is constructed to monitor the sync condition of the digital output. When sync is lost, for example due to a low input signal level or due to an out of phase situation, the gain of the output increased to relatively high level so as to enhance the possibility of detecting the sync condition. As soon as sync is reestablished the gain is immediately turned down to a level lower than the blanking level and then gradually increased to the blanking level. The gain levels at startup and during the sync reestablishment intervals are fixed but under selective control.

15 Claims, 3 Drawing Sheets

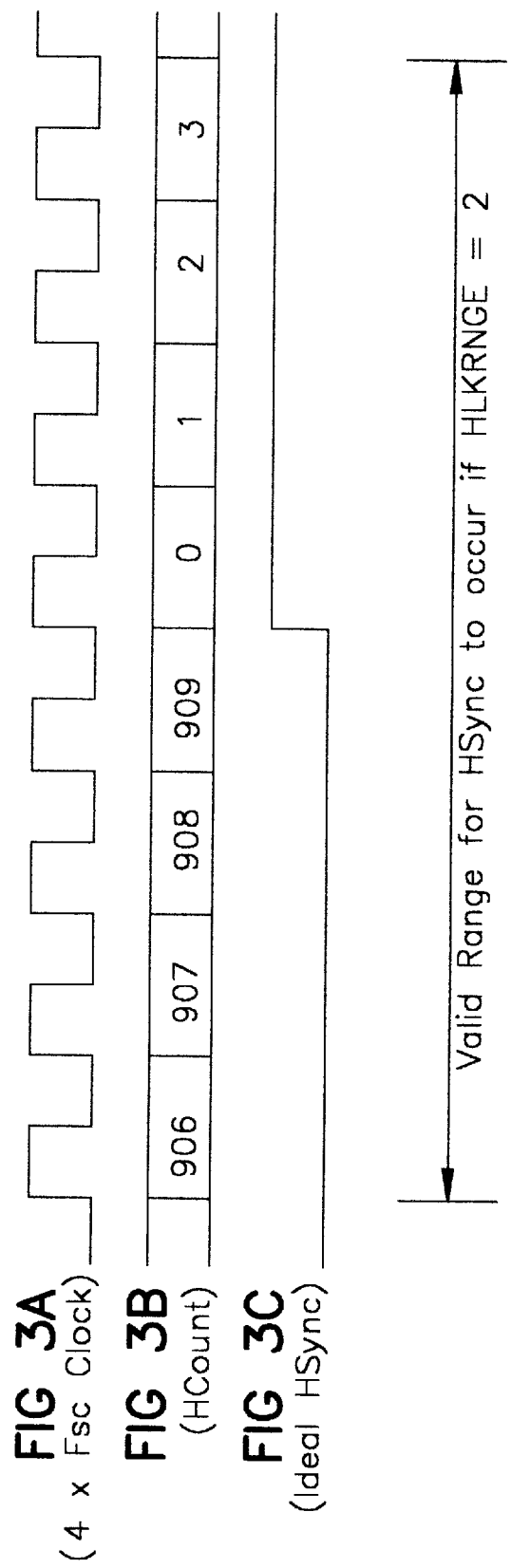

SYSTEM AND METHOD FOR MULTI-LEVEL GAIN CONTROL

TECHNICAL FIELD OF THE INVENTION

This invention relates to gain control systems and more particularly to a gain control circuit for use in controlling television signals.

BACKGROUND OF THE INVENTION

A common requirement is to take an incoming video signal from any video source and prepare that signal for display in digitized form on a PC screen. There are several inherent problems with such a task. For example, if the input signal is a broadcast signal, it can be weak, or if the signal is from a video tape, frequently the tape is stretched or distorted and the signal can be weak or noisy resulting in loss of sync.

Accordingly, it is desired to take a non-ideal video signal and, if necessary, amplify it and put that signal in a format that is compatible with digital processing circuitry for subsequent display on a video screen.

It is further desired to have a circuit which has the capability of regaining lost sync for input video signals which can vary in strength and then convert the captured signals into digital format.

SUMMARY OF THE INVENTION

These and other objects and objectives are achieved by a system and method which takes advantage of the fact that a video signal always has a known video blanking level which repeats on a periodic basis. Thus, when a signal is lost (i.e. sync is lost) the assumption is that the signal amplitude is too low to detect the vertical blanking level. At that point, the input signal is amplified to an artificially high value based on the fact that we know what the values of the signal will be at the blanking level which is used as a reference point.

Once sync is regained, an automatic gain control (AGC) circuit turns down the signal to a known level and then ramps the signal back up in well-defined increments until the output of the analog to digital converter matches a fixed reference level.

In one embodiment, a sync detector is used to detect if and when sync is lost on the incoming video signal. This can occur if the signal is highly distorted or if the incoming video level is very low. The output of the sync detector is fed to an AGC circuit which then turns the gain to a high level to amplify the signal as much as possible. Once this occurs, the AGC circuit drops to a low level, such as ground, and increases in steps until a reference level, typically the blanking level is achieved.

Accordingly, one technical advantage of this invention is that the circuit detects when sync has been lost in the incoming video signal and actually operates to reestablish a sync status.

A second technical advantage of the invention is that the circuit can regain sync on a lost signal on an iterative basis.

Another technical advantage of the invention is that the circuit can turn the gain up or down on an incoming signal under control of fixed levels contained in registers.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and the specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawings, in which:

FIGS. 3, 3A, 3B, and 3C show a graph of ranges for sync control.

DESCRIPTION OF THE PREFERRED EMBODIMENTS

Figure 1:
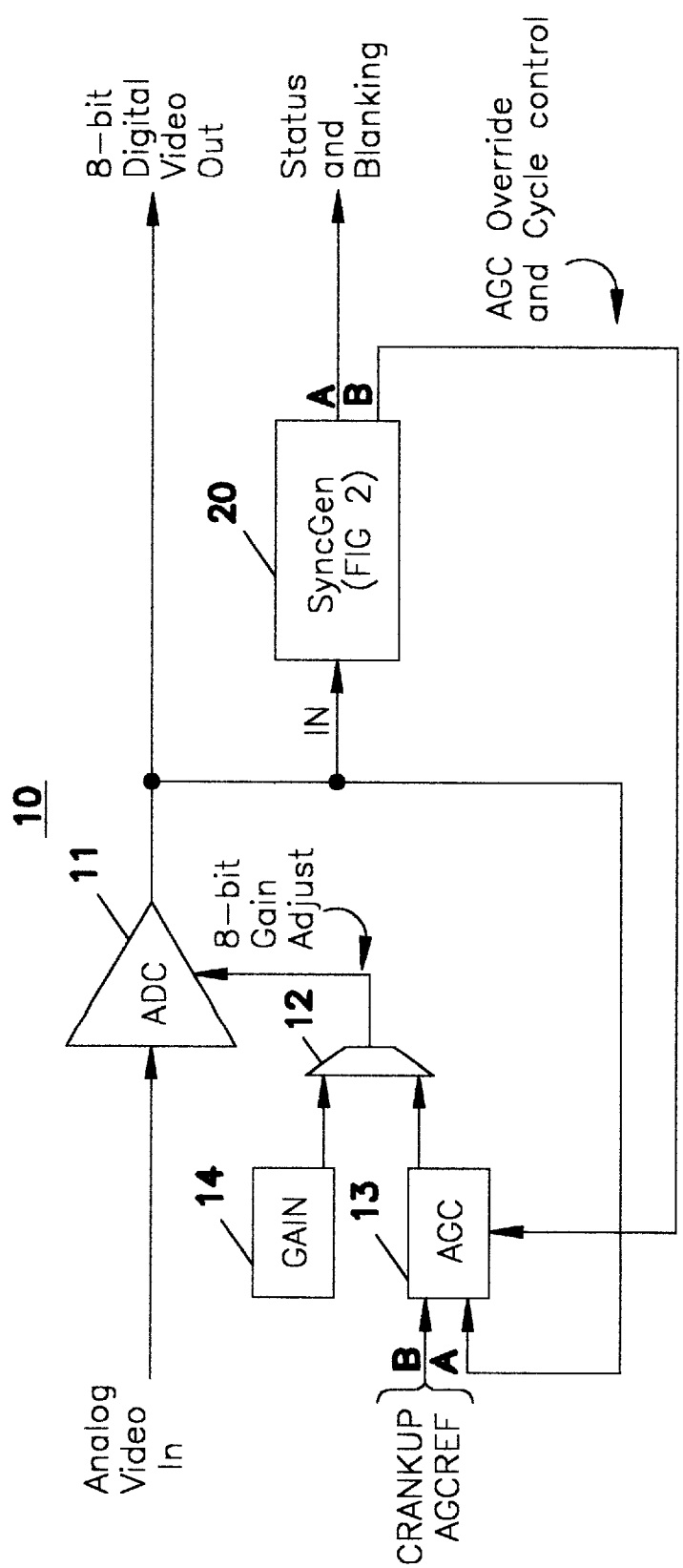
FIG. 1 shows details of one embodiment of the inventive concepts.

Turning now to FIG. 1, the analog input signal to video gain/sync control circuit 10 is in a standard transmission format via lead ANALOG VIDEO In and is piped directly to analog to digital (ADC) converter 11. The analog input signal can be an NTSC signal which is the American video format, or it can be a PAL signal which is the European video transmission format or any other video signal having known periodic characteristics. A/D converter 11 is an 8-bit converter that essentially takes the analog input signal, converts it to an 8-bit digital stream which is then fed back to input A of A automatic gain control circuit (AGC) 13.

AGC 13 controls the gain of the video signal and establishes it at a level that is compatible with and can be operated on by the downstream digital circuitry. The output of AGC 13 is an 8-bit gain adjust reference that is fed back to ADC 11 via MUX 12. The purpose of MUX 12 is to switch between the AGC output or a preprogrammed gain register 14, either one of which can control the reference value of A/D converter 11. MUX 12 can be eliminated if desired.

For gain register 14, the default value (or startup) is essentially set to midpoint which provides a gain of one. The range of the gain can be from zero which obviously gives a signal value of zero to a signal level of FF which is an 8-bit signal. FF is the maximum gain and, in theory, can provide gain to the signal all the way to the full 5 volt swing.

There are also two registers (not shown) in AGC 13. One is called crank up and operates from the crank up to input. The crank up register controls the maximum value that the gain control is set at in the case of lost sync. Thus, if sync generator 20 loses sync (as will be discussed) on the incoming video signal, it will send a signal to AGC 13 to set its value to the crank up level, which typically is set very high, at or near FF. The purpose of this is to increase the gain of the incoming signal all the way to a maximum value for the purpose of allowing the circuit to receive sync.

There is a second register (not shown) in AGC 13 operating from input AGCREF, which has the purpose of providing a reference for AGC 13 in the case where the signal is under automatic gain control during sync conditions.

In operation, in the situation where sync has been lost and then regained, AGC 13 will turn itself all the way down and ramp up until the level of the 8-bit video stream input A is at a level consistent with the value programmed in the AGC REF register via input B.

The function of sync gen circuit 20 is to take as an input the 8-bit digital video stream from ADC 11 and use the equalization pulses in the vertical blanking interval to provide a sync signal for the rest of the circuitry downstream.

Circuit 20's output provides a series of status and blanking signals, and also provides control signals for AGC 13 as will be discussed.

Figure 2:
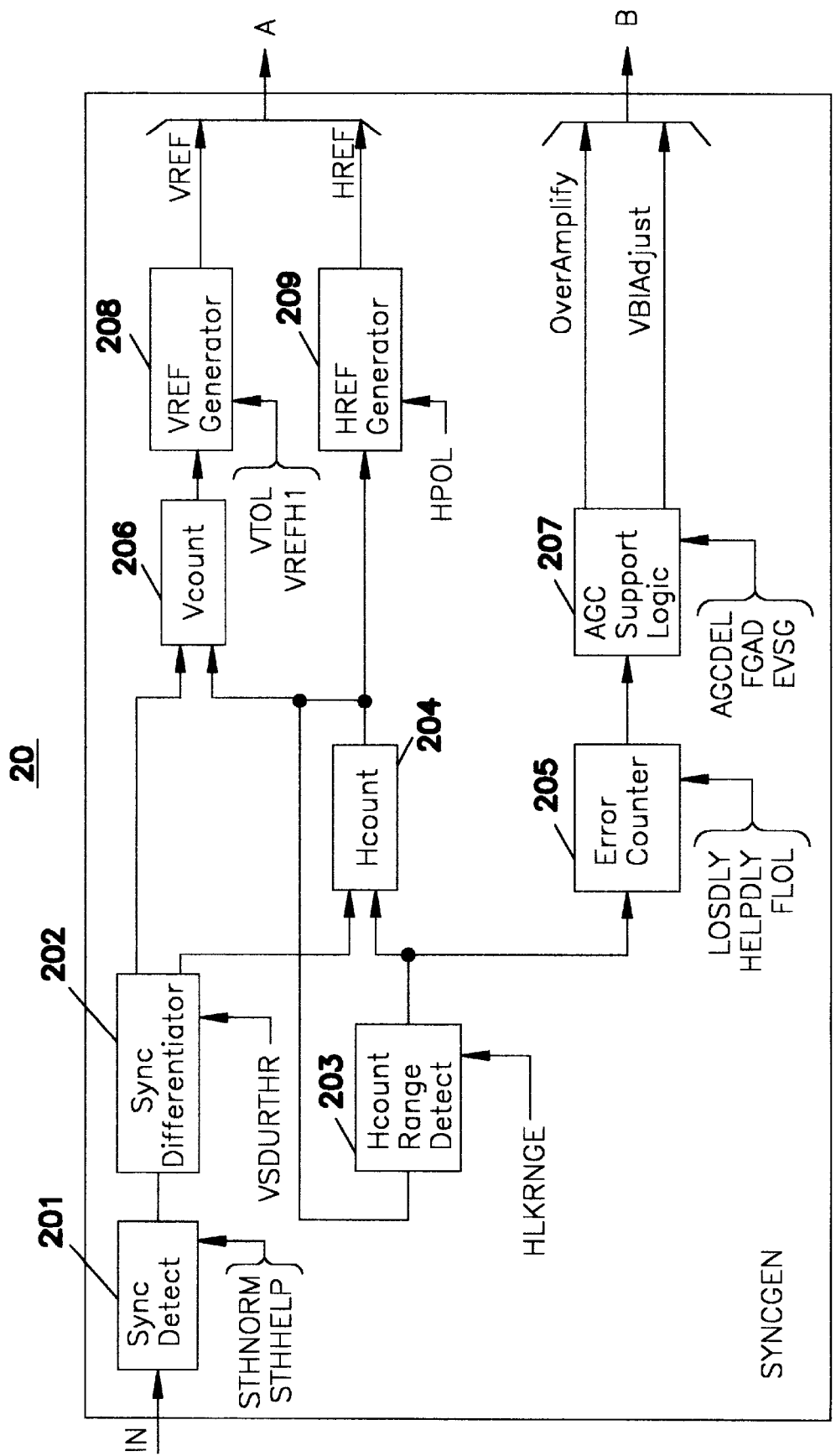
FIG. 2 shows details of the sync generator circuit.

Turning now to FIG. 2, sync gen circuit 20 provides the reference timing for controlling the output video signal from circuit 10 (FIG. 1).

Sync detect circuit 201 provides the initial sync separation from the remainder of the incoming digitized video signal. This differentiation is performed with a threshold detection of the incoming video signal. Sync detect 201 uses one of two software programmable registers (not shown) to provide the threshold value. Under normal operation, the STHNORM register is used. When sync generator 20 is attempting to achieve synchronization with a very low amplitude signal, and is working with AGC 13 to detect a difficult signal, it uses the threshold value stored in the STHHELP register.

Sync differentiator 202 examines the extracted sync signal for the purpose of separating vertical from horizontal sync events. The differentiation between horizontal and vertical sync is made by the duration of the extracted sync signal with respect to the value stored in the programmable VSDURTHR register. A sync pulse which is shorter, as measured in 4*Fsc clock periods (where Fsc means color sub-carrier frequency and 4*Fsc is 4 times Fsc) than this value is considered as being either a horizontal sync or equalization pulse. Pulses longer than this are considered to be vertical sync pulses.

Hcount circuit 204 of sync generator 20 provides the equivalent function of a horizontal oscillator in a traditional television. Hcount 204 is a counter that counts from zero up to some maximum count, then is reset back to zero. The counter counts on 4*Fsc clock intervals. In NTSC mode, the counter normally counts from 0 to 909. In PAL mode, it counts from 0 to 1134.

Hcount circuit 204 has been designed to have some 'momentum'. This 'momentum' is provided by the Hcount range detect circuit 203. The software programmable HLKRNGE register defines an 'error window' for Hcount circuit 204 via range detect circuit 203. The window defined by HLKRNGE defines a range, specified in 2*Fsc intervals and defines a plus and minus acceptable deviation between the time that Hcount counter 204 resets from its maximum count back to zero, and the time when a horizontal sync is detected.

As long as a horizontal sync occurs within this defined window, the circuit is considered to be in sync with the incoming video, and the detected horizontal sync will cause Hcount counter 204 to reset to zero. HLKRNGE therefore provides a mechanism for defining the tolerance of Hcount counter 204 to deviations in the consistency of incoming horizontal sync intervals.

A window defined by HLKRNGE is shown in FIGS. 3A, 3B, 3C. In this example, HLKRNGE has been set to 2, indicating that the valid range for Hsync (FIG. 3C) to be detected is plus or minus 2*2=4 internal 4*Fsc clock periods (FIG. 3A).

As long as horizontal syncs (FIG. 3A) are detected during the window defined by HLKRNGE, the circuit is considered to be locked to the incoming video. If a horizontal sync is detected outside of the defined window, or if a window passes without an Hsync being detected, error counter circuit 205 detects either of these conditions and declares it to be an error.

An error may be due to a spurious event, or may be due to the decoder being presented with a different video source. In either event, error counter 205 is designed to contain a degree of tolerance to errors in the incoming signal.

Error counter 205 is incremented when an error condition is detected, but will be reset back to zero if a horizontal sync is detected within the defined window. Hcount counter 204 continues to count whether or not sync has been detected, and will count either 910 or 1135 clocks, depending on the mode.

A software programmable register called LOSDLY provides error counter circuit 205 with a tolerance threshold. When consecutive errors occur equal to the LOSDLY level, sync generator 20 is considered to be out of lock with the incoming video signal.

When sync generator 20 is in an out-of-lock state, it immediately tries to resynchronize with the incoming video stream. It does so by considering the next detected horizontal sync to be a valid sync, and proceeds to reset Hcount 204 when the next sync occurs. It resets the error counter, and considers itself to be back into a locked state. If the out-of-lock condition was caused by a sudden switch in video sources, sync generator 20 will now be locked with the new source.

The FLOL bit of error counter 205 is used to force sync generator 20 into an out-of-lock condition, at which time it will immediately try to resynchronize with the incoming signal. The SYNCCTRL register (not shown) is used to hold control bits for setting circuit parameters.

A second parameter, called HELPDLY, provides a mechanism via error counter 205 to extend even more tolerance to sync generator 20 for cases where reacquiring lock outs are not desired and while every possible opportunity is given to the circuit for regaining sync without further operation with the circuit. HELPDLY typically is a value larger than LOSDLY, and is used by comparing it against error counter 205. Ideally, error counter 205 should never reach the HELPDLY value as long as a video signal is present, since error counter 205 will be reset back to zero on the first horizontal sync after it reaches the LOSDLY count.

If the loss of sync is due to losing a signal, or due to switching to a signal with a substantially different amplitude, reacquiring lock may be a bit more difficult. If error counter 205 reaches the HELPDLY value, a 'last ditch' effort is made to find the sync in the incoming signal by working closely with AGC 13 via AGC support circuit 207.

The FGAD bit of the SYNCCTRL register may be used to force sync generator 20 via AGC support logic 207 into this condition, simulating that HELPDLY errors have occurred. This, in turn, forces AGC support logic 207 to work with AGC 13 to reacquire lock.

HREF generator circuit 209 functions to generate a fixed-length HREF signal. Since error counter 205 and Hcount range detect 203 allow Hcount counter 204 to continuously count whether a video signal is present or not, the HREF output is either locked to the incoming video (if it is detected), or free running at an ideal rate (910 clocks for NTSC, 1135 for PAL) if no video is present.

The polarity of HREF may be changed via the HPOL bit of the SYNCCTRL register.

Vcount circuit 206 provides a function similar to a vertical oscillator in a traditional television. Its purpose is to count horizontal line event times. The counter is reset to zero on a field basis by the detection of vertical sync, and counts lines within a field.

VREF generator 208 is used to generate the VREF signal. Unlike HREF, the pulse width of VREF is programmable via the VREFHI register.

The polarity of VREF may be changed via the VPOL bit of the SYNCCTRL register. As discussed, status and blanking are controlled with the VREF and HREF leads.

AGC support circuit 207 works in conjunction with error counter 205 and with AGC 13. When the number of errors that have been detected reaches the value defined in the HELPDLY register, AGC support logic 207 instructs AGC 13 to adjust the gain so as to overamplify the incoming signal as discussed above.

In this overamplified mode, the integrity of the video signal is severely compromised and thus, the video output should be disabled during this interval by monitoring the OVERAMPLIFY output logic 207.

During this time, sync detect circuit 201 uses the threshold value of the STHHELP register in trying to detect sync.

If sync generator 20 is still not able to reacquire sync lock, the continued high (or 1) on output OVERAMPLIFY will be an indication of this condition.

If sync generator 20 is able to reacquire lock with an overamplified incoming signal, AGC support logic 207 will wait until a lock has been established, then proceed to wait until the following vertical interval. Following the vertical sync pulse stream, and during the time when the incoming video signal is at the blanking level following an equalization pulse, AGC support logic 207 will remove the AGC 13 command to overamplify.

As shown in FIG. 1, removal of this command counsel AGC 13 to perform an automatic gain control sequence, forcing it to adjust ADC 11 gain such that ADC 11 will output the expected gain level as specified by AGC REF for a blank level.

With ADC 11 gain properly adjusted, sync generator 20 should now be in condition to maintain a lock on the incoming video.

As a matter of periodic ADC 11 'maintenance', AGC support logic 207 may be enabled by way of the EVSG bit of the SYNCCTRL register to instruct logic 207 to perform an automatic gain control sequence during each (or during selected ones of the) vertical blanking interval. This vertical blanking interval adjust command to logic 207 is a one-clock pulse that occurs after vertical sync, and during the time when the incoming video signal is at a blank level. Outputs OVERAMPLIFY and VBIAdjust control this function as well as the AGC override and cycle control.

Note, that while fixed register values are discussed, these can be made dynamically changeable by external control or by signals provided from within the circuit.

Although the present invention and its advantages have been described in detail, it should be understood that various changes, substitutions and alterations can be made herein without departing from the spirit and scope of the invention as defined by the appended claims.

We claim:

1. A circuit for use in controlling signals having repetitive sync signals and a known signal level during a blanking period, said circuit comprising:

means for detecting the sync status of an input signal;

means responsive to a detected loss of said sync status in said input signal for adjusting the gain of said input signal to a preestablished maximum level;

means responsive to a subsequently detected regaining of sync status for readjusting said gain to a preestablished blanking level; and means for thereupon gradually increasing said gain of said signal until said sync status is maintained at a reference level.

2. The invention set forth in claim 1 further including means for selectively controlling said preestablished maximum level.

3. The invention set forth in claim 1 further including means for selectively controlling said reference level.

4. The invention set forth in claim 1 further including means for providing an external control signal during any period where said input signal is gain adjusted to said maximum level.

5. The invention set forth in claim 1 wherein said input signal is a video signal and wherein said controlled signals are video signals provided to an output, said circuit further including means for maintaining any video signals provided to said output at a constant level during all periods when said sync status has been maintained.

6. The invention set forth in claim 5 wherein said sync status detecting means includes means for counting sync errors.

7. The invention set forth in claim 6 further includes means controlled by said sync error counting means for delaying said detected loss for a number of errors.

8. The method of processing a video signal stream where said video stream has repetitive vertical and horizontal blanking periods and a known signal level during said horizontal blanking period, said method comprising the steps of:

monitoring at least one of said blanking periods to determine a sync lock condition of said video stream and to determine a sync lock lost condition of said video stream;

adjusting the gain of said video stream to a relatively high condition upon a determined sync lock lost condition of said video stream;

continuing to monitor said gain adjusted video stream to determine a reacquired sync lock condition of said gain adjusted video stream;

adjusting the gain of said video stream to a level lower than said blanking level upon a determined reacquired sync lock condition; and increasing said low level gain adjusted video stream to a known reference level while still maintaining said reacquired sync lock condition.

9. The method set forth in claim 8 further including the step of providing an output control signal during any period of time when said video stream is being relatively high gain adjusted.

10. The method set forth in claim 8 further comprising the step of maintaining said processed video stream at a constant level during all detected sync lock periods of time.

11. The method set forth in claim 8 wherein said monitoring step includes the step of:

counting errors between times when known repetitive signals are detected and times when said known repetitive signals are not detected during a period of time.

12. The method set forth in claim 11 wherein said error counting step includes the step of:

controlling a loss of sync determination until a certain number of counted errors has occurred.

13. The method set forth in claim 12 further comprising the step of:

selectively controlling said certain number.

14. A circuit comprising, an input for accepting a video signal to be processed;

an output for providing a processed output video signal;

an analog to digital converter (ADC) circuit for accepting a video signal provided at said input and for converting said signal to a digital format representative of said input video signal, the output of said ADC connected to said circuit output a gain control circuit (AGC) having one input connected to said ADC output, the output of said AGC connected to a gain control input of said ADC, said AGC having selectable gain settings;

a sync detector/generator having an input connected to said output of said ADC and having one output for providing video control signals to said circuit output and having a second output connected to a control input to said AGC, said detector/generator operable for determining sync/non-sync conditions of digital inputs received at its said input and for providing control signals over said second output to said AGC for selecting one of said selectable settings of said AGC.

15. The invention set forth in claim 14 further including a MUX having one input connected to said AGC output and a second input of said MUX having a gain setting for selective control of said ADC, the output of said MUX connected to said control input of said ADC.

* * * * *